(No Model.)
F. TERSTEGEN.
Nose Piece for Eyeglasses.
No. 238,985. Patented March 15, 1881.
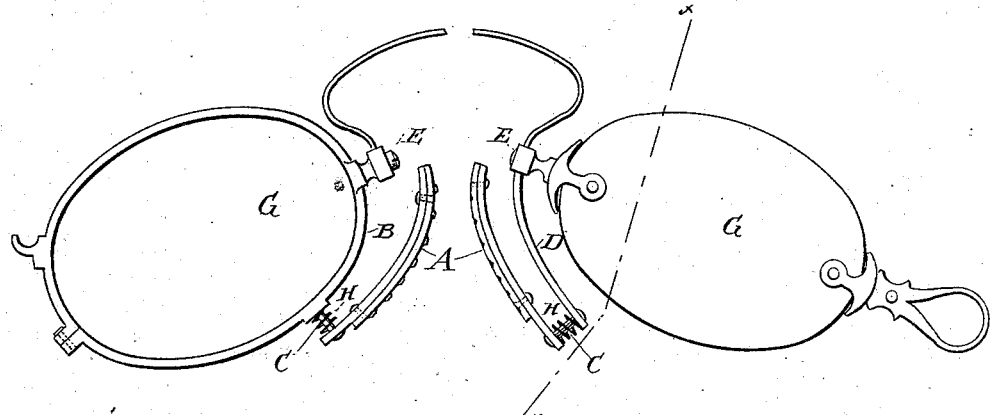
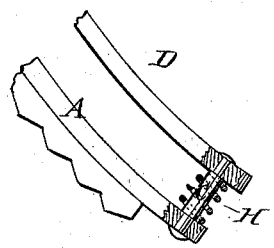
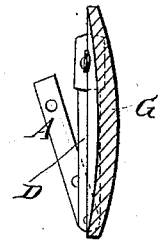
WITNESSES:
Chas. Niola
C. Sedgwick
INVENTOR:
F. Terstegen
BY Munn & Co
ATTORNEYS.

UNITED STATES PATENT OFFICE.

FRED TERSTEGEN, OF ELIZABETH, NEW JERSEY.

NOSE-PIECE FOR EYEGLASSES.

SPECIFICATION forming part of Letters Patent No. 238,985, dated March 15, 1881.

Application filed November 2, 1880. (No model.)

*To all whom it may concern:*

Be it known that I, FRED TERSTEGEN, of Elizabeth, in the county of Union and State of New Jersey, have invented a new and Improved Eyeglass, of which the following is a specification.

The object of the invention is to allow the nose-rest to be moved in or out of the same plane with the glasses, and by the pressure of a spring to be confined in any particular position, thus insuring firmness to the nose-rests, and avoiding the chance slipping of the glasses from their position, and thus injuring the wearer.

In the accompanying drawings, Figure 1 is a longitudinal elevation of an eyeglass provided with the movable spring nose-rest. Fig. 2 is a longitudinal elevation of a frameless eyeglass provided with my improved movable spring nose-rest. Fig. 3 is a cross-sectional elevation, on the line $x\,x$, of the glass shown in Fig. 2. Fig. 4 is a longitudinal sectional elevation through the movable spring-clamps.

The nose rests or clamps A A may be made of rubber, horn, celluloid, or like material, or of a strip of metal covered with one of the above materials, and are pivoted to the frame B by means of a pin, C, as shown in Fig. 1; or they are pivoted, by means of the pin C, to the lower end of a spring, D, secured in the bow-socket E, as shown in Fig. 2. The nose-rests A A can be turned on their pivots and moved out of the plane of the glasses G G, so as to fit to the nose more conveniently, or to be adjusted according to the objects to be viewed; but as the pivots C C are liable to wear off very rapidly, the clamps A A would drop by their own weight, and the person wearing the eyeglass would be apt to run these clamps or nose-rests into his eyes, and thus injure himself very seriously; and, also, if these nose-rests are held so loosely that they can swing freely, they are apt to be broken when the eyeglass is being closed. To avoid all these defects I surround the pivots C C by a spiral spring, H H, which presses against the inner side of the pivoted nose-rest and against the frame B or spring D, and thus will hold the nose-rests A A in any desired position.

The spiral spring may be replaced by various other springs or elastic cushions placed between the nose-rests and the frame B or spring D.

Having thus described my invention, I claim as new and desire to secure by Letters Patent—

In an eyeglass, the pin C, rigidly attached to frame B, and having a head on its outer end, a nose-rest pivoted on said pin, and a spiral spring arranged between the frame and nose-rest, said spring pressing the nose-rest firmly against the head of the pin, whereby the nose-rest may be moved and held at any point of adjustment, as described.

FRED TERSTEGEN.

Witnesses:
 OSCAR F. GUNZ,
 C. SEDGWICK.